(12) United States Patent
Breitbach

(10) Patent No.: US 7,779,246 B2
(45) Date of Patent: Aug. 17, 2010

(54) CONTENT AND SECURITY PROXY IN A MOBILE COMMUNICATIONS SYSTEM

(75) Inventor: Thomas Breitbach, Nickenich (DE)

(73) Assignee: Deutsche Telekom AG, Bonn (DE)

( * ) Notice: Subject to any disclaimer, the term of this patent is extended or adjusted under 35 U.S.C. 154(b) by 1343 days.

(21) Appl. No.: 10/518,116

(22) PCT Filed: Jun. 13, 2003

(86) PCT No.: PCT/DE03/01998

§ 371 (c)(1),
(2), (4) Date: May 13, 2005

(87) PCT Pub. No.: WO03/107599

PCT Pub. Date: Dec. 24, 2003

(65) Prior Publication Data

US 2005/0204152 A1      Sep. 15, 2005

(30) Foreign Application Priority Data

Jun. 14, 2002   (DE) ................... 102 26 744

(51) Int. Cl.
*H04L 29/06* (2006.01)

(52) U.S. Cl. ................... 713/154; 726/13

(58) Field of Classification Search ........... 713/154
See application file for complete search history.

(56) References Cited

U.S. PATENT DOCUMENTS

| 5,991,407 | A | * | 11/1999 | Murto ................... 380/248 |
| 6,516,192 | B1 | * | 2/2003 | Spaur et al. ............ 455/450 |
| 6,968,453 | B2 | * | 11/2005 | Doyle et al. ............ 713/168 |
| 2002/0174335 | A1 | * | 11/2002 | Zhang et al. ............ 713/168 |
| 2003/0016655 | A1 | * | 1/2003 | Gwon ................... 370/352 |
| 2003/0033522 | A1 | * | 2/2003 | Bilgic et al. ............ 713/168 |
| 2003/0061166 | A1 | * | 3/2003 | Saito et al. ............ 705/54 |

FOREIGN PATENT DOCUMENTS

| WO | WO 97 49252 | 12/1997 |
| WO | WO 00 36793 | 6/2000 |
| WO | WO 01 33889 | 5/2001 |

* cited by examiner

*Primary Examiner*—Matthew B Smithers
(74) *Attorney, Agent, or Firm*—Kenyon & Kenyon LLP

(57) ABSTRACT

A method and device is provided for making available security functions during the transmission of data from and to a subscriber terminal of a mobile communications network. A real-time analysis of the data flow from and to the subscriber terminal is carried out in a device of a network node of the mobile communications network during which data with contents defined beforehand by the subscriber or by a network operator/provider are identified and processed. This results in protecting the terminal and subscriber's devices connected thereto from external attacks.

12 Claims, 1 Drawing Sheet

CONTENT AND SECURITY PROXY IN A MOBILE COMMUNICATIONS SYSTEM

FIELD OF THE INVENTION

The present invention relates to a method and a device for making available security functions during the transmission of data from or to a subscriber terminal unit of a mobile communications network.

BACKGROUND INFORMATION

Current and new data services offer subscribers of mobile communications networks direct access to the internet and other public data networks. Therefore, the mobile telephone used for mobile application, and ancillary equipment driven by it, such as a notebook or a personal digital assistant, are at the mercy of the most varied attacks by third parties, similar to what happens in a fixed network-based internet access.

SUMMARY OF THE INVENTION

Embodiments of the present invention concern a method and a device for making available security functions in the transmission of data from and to a subscriber terminal unit of a mobile communications network, so as to effectively protect the subscriber terminal unit and units connected to it or combined with it.

Embodiments of the present invention concern, in a cellular mobile telephony network, a security service that is able to be personalized, individually per cellular mobile telephony connection and subscriber.

In embodiments of the present invention, the subscriber may adjust security settings interactively or dynamically.

The network operator may specify a series of meaningful standard settings for the filter functions, such as virus protection, protection from advertising mail, etc.

In this context, the protective function is offered by a network-specific device in the form of a security and filtering device. In addition, the general protective function may be coupled with a memory function, i.e., parts of the data traffic are temporarily stored in the device, and may be retrieved by the subscriber. Consequently, the security and filtering device may additionally take over the function of a so-called proxy. Proxy means representative service. Proxies accept requests from a client, for instance, a terminal unit, and pass them on, possibly modified, to the original destination, such as an internet supplier. Proxies are able locally to file data that are passed through and to deliver them upon the next access.

With that, at the same time, one can achieve an increased performance, since certain contents may be buffered.

According to the present invention, the following protective functions may be offered by the system embodiments described:

Filtering of the data traffic on an IP/TCP basis in the form of a so-called firewall function;

Filtering/refusing data packets of a certain origin (IP address) or data packets from and to certain services (TCP ports); and An analysis of the data content for contents that are malicious or critical to security.

The entire content of a data connection is analyzed and searched according to certain patterns. Signatures of viruses, etc, are tracked down and rendered harmless before they reach the terminal unit of the subscriber.

An analysis of the data content for undesired subject matter, such as in the form of spam, advertising or offensive material. For this, the entire content of the connection is analyzed and content stated by the subscriber as being undesired is filtered out, for instance, to protect children and juveniles.

The network operator is able to use the mechanisms of the system in order purposefully to cut out, for certain subscribers, certain data traffic, such as services liable to costs, if the subscriber has not subscribed to this service.

The filtering function for the data content may be enhanced meaningfully and technically, using the same mechanisms additionally using the following functions.

For example, a limiting of the data transfer volume can be relatively easy to implement. To do this, the entire traffic, under certain circumstances separated into incoming and outgoing traffic, is summed up, and additional traffic is stopped if the limit specified by the user or operator is exceeded.

In addition, budget compliance may be checked, using one component to calculate the compensation. The subscriber or the operator may specify a certain upper limit for communications cost. If the established budget is exceeded, the subscriber is notified and the data traffic is stopped. This makes possible an effective cost control and cost transparency.

Additional functions may be integrated into the system in a meaningful way as indicated in the following.

If certain events occur, i.e., if attacks are detected, spam mails are filtered or similar events are recognized by the system, and notification is made of the subscriber or network operator, in order to enable a transparent control of the data filtered out.

The subscriber may also decide administratively whether the subscriber's entire traffic should be conducted over the system or only selectively, i.e., at certain times, according to specific incidents or upon suspicion of misuse.

In embodiments of the present invention, a distributed implementation of the filter functions may be provided, i.e., the security and filter device is not provided centrally in one network node of the mobile communications system, but rather in a distributed manner, or individually in a plurality of network nodes. The load on a single node is reduced thereby.

This device of the system may a) be conditioned spatially or upon network technology, i.e., distribution to several networks or network nodes, b) be conditioned functionally, for instance, special filter components for certain data contents, and, for example, email filters, virus filters, etc., or c) conditioned upon architecture or software technology, based, for example, on the use of special hardware and system software for certain functions.

The administration of these additional functions may be performed in each case centrally, from a certain node.

DETAILED DESCRIPTION

Figure 1:
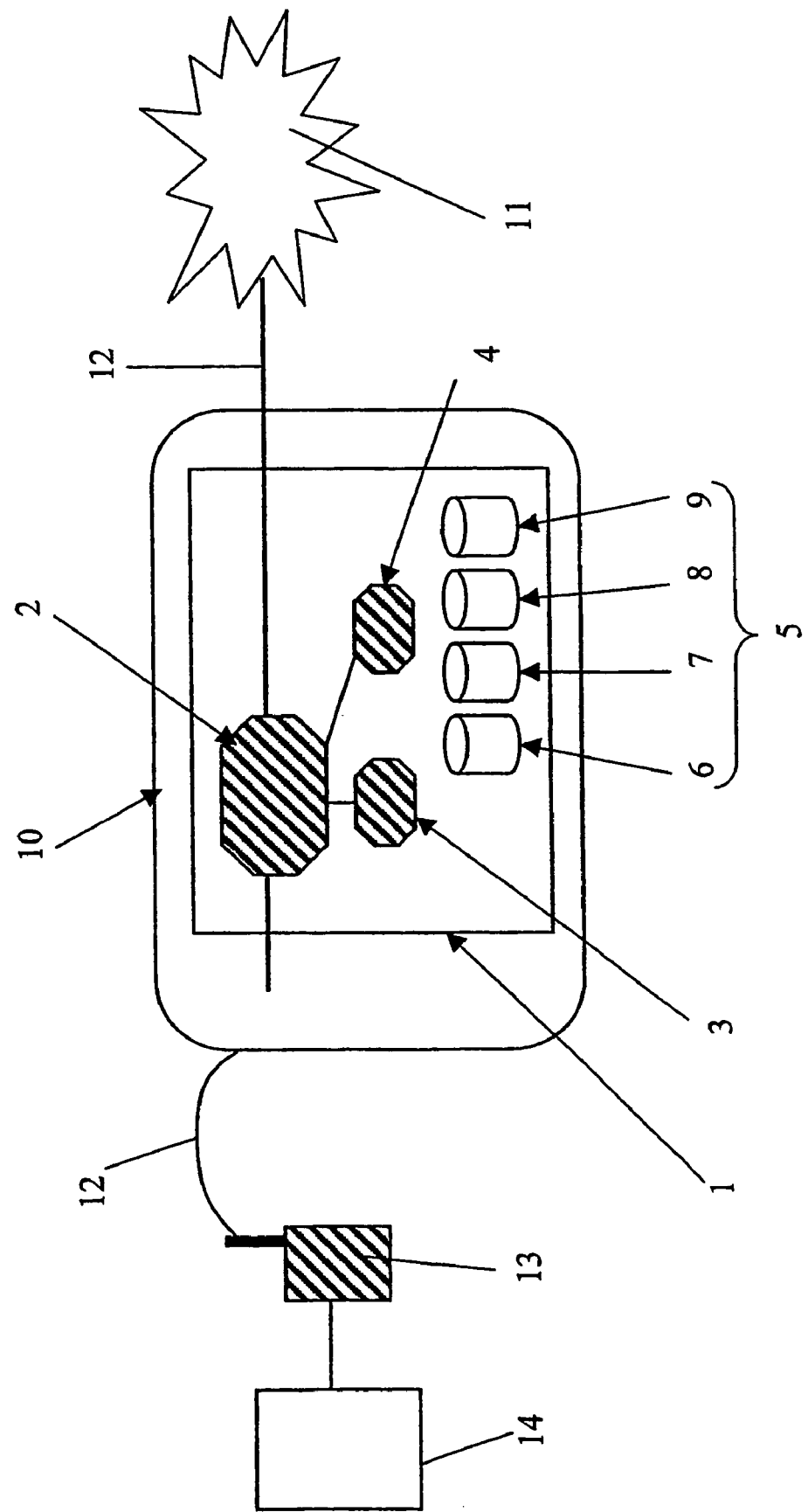
FIG. 1 shows a schematic of the technical design of the system.

The system is a part of a mobile communications network 10, which permits a multiplicity of subscriber terminal units 13 communications with other public networks, such as the internet 11. Furthermore, combined units 14, such as a personal computer (PC), personal digital assistant (PDA), Smartphone, etc., that are connected to cellular mobile telephony terminal unit 13, may be provided, which make possible a comfortable, mobile internet use.

Security and filter device 1 is situated within mobile communications network 10, e.g., within an appropriate network node, such as an exchange MSC, and it may be made up of the functional parts described below.

General Filter Component 2:

This component has a variable filtering function specifiable by the subscriber/network operator. It analyzes in real time the data flow 12 exchanged between terminal unit 13 of the subscriber and internet 11. Subscriber traffic 12 in both directions goes via this filter 2 and is analyzed there.

Authentication Component 3:

In order to use security and filtering device 1, the subscriber has to authenticate himself vis-a-vis the system. Thus, it is ensured that no unauthorized access can take place to, for example, the personal settings of the subscriber. For example, the authentication may occur via call number MSISDN of the subscriber. The subscriber is protected more securely by the use of an additional PIN or a password. If necessary, a cryptographic authentication method may be used, e.g., certificates of the subscriber.

Administrative Component 4:

This component forms the interface between the system and the subscriber. Here the subscriber may administer the subscriber's personal settings. This can be done directly via the cellular mobile telephony system, the internet and/or fixed network-based customer interfaces of the network operator.

Database 5:

Database 5 describes which data are to be filtered out by filtering component 2 or are to be processed. This database 5 may be split up into four databanks. First databank 6 may include the individual filter and settings per subscriber. Second databank 7 may include the filter and settings per mobile phone type.

Third databank 8 may include the network operator-specific settings and filter, and fourth databank 9 may include the general settings and filter.

What is claimed is:

1. A method for making available security functions for the transmission of data from and to a subscriber terminal unit of a mobile communications network, comprising:
    carrying out a real-time analysis of the data flow from and to the subscriber terminal unit in a device of a network node of the mobile communications network, the data having contents specified previously by one of a subscriber and a network operator being recognized and processed further; and
    carrying out first an authentication method by which the subscriber is authenticated via the device of the network node,
    wherein at least one of an arising data transfer volume and an arising data transfer cost is limited to a predefined measure, and wherein the authentication method is adjustable at least one of dynamically and interactively.

2. The method of claim 1, further comprising recognizing and processing further data traffic from and to specified senders and receivers.

3. The method of claim 1, wherein the recognized data is at least one of selected, isolated, deleted and made available to one of the subscriber and the network operator for further processing.

4. The method of claim 1, wherein a filtering of the IP/TCP-based data traffic is carried out.

5. The method of claim 1, wherein the predefined measure is established by one of the subscriber and the network operator.

6. The method of claim 1, further comprising notifying at least one of the subscriber and network operator upon the recognition of at least one of certain data content and sender.

7. The method of claim 1, further comprising:
    storing temporarily the data such that the stored data is retrievable by the subscriber.

8. The method of claim 1, further comprising:
    filtering data traffic such that the data packets in the traffic of at least one of a certain IP address and a certain a service port are refused transmission.

9. The method of claim 1, wherein the contents of the data are analyzed and searched according to a predefined pattern.

10. A device for making available security functions for the transmission of data from and to a subscriber terminal unit of a mobile communications network, including a security and filtering device comprising:
    a filter component for the real-time analysis of the data flow from and to the subscriber terminal unit;
    an authentication component for authenticating the subscriber vis-a-vis the security and filtering device, the authentication component being adjustable at least one of dynamically and interactively;
    an administrative component as the interface to the subscriber; and
    a database for storing subscriber-specific and network operator-specific data and security and filtering functions.

11. The device of claim 10, wherein the security and filtering component is positioned in one or more network nodes of the mobile communications network.

12. The device of claim 11, wherein special filter components are established for certain data contents.

* * * * *